US009154626B2

(12) United States Patent
Uba et al.

(10) Patent No.: US 9,154,626 B2
(45) Date of Patent: Oct. 6, 2015

(54) SECRET TRANSFERS IN CONTACT CENTERS

(71) Applicant: Avaya Inc., Basking Ridge, NJ (US)

(72) Inventors: Gene Masaru Uba, Broomfield, CO (US); Michael Alan Bland, Boulder, CO (US); Robert C. Steiner, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/836,038

(22) Filed: Mar. 15, 2013

(65) Prior Publication Data
US 2014/0270138 A1 Sep. 18, 2014

(51) Int. Cl.
*H04M 3/523* (2006.01)
*H04M 3/51* (2006.01)
*H04M 3/58* (2006.01)

(52) U.S. Cl.
CPC .......... *H04M 3/5233* (2013.01); *H04M 3/5175* (2013.01)

(58) Field of Classification Search
CPC ........................... H04M 3/5175; H04M 3/5233
USPC ...................................... 379/212.01
See application file for complete search history.

(56) References Cited

U.S. PATENT DOCUMENTS

| 7,679,636 | B1 * | 3/2010 | Beck et al. ................. 348/14.01 |
| 2005/0135335 | A1 * | 6/2005 | Hession et al. ............... 370/352 |
| 2007/0019801 | A1 * | 1/2007 | Brenneman et al. ..... 379/265.11 |
| 2007/0036332 | A1 * | 2/2007 | Busayapongchai ...... 379/265.09 |
| 2008/0159519 | A1 * | 7/2008 | Lovric et al. ............. 379/265.09 |
| 2008/0232575 | A1 * | 9/2008 | Gumbula ................. 379/265.11 |
| 2010/0235218 | A1 | 9/2010 | Erhart et al. |
| 2010/0246797 | A1 * | 9/2010 | Chavez et al. ........... 379/265.02 |
| 2010/0296417 | A1 | 11/2010 | Steiner |
| 2011/0125793 | A1 | 5/2011 | Erhart et al. |
| 2011/0125826 | A1 | 5/2011 | Erhart et al. |
| 2011/0255683 | A1 | 10/2011 | Flockhart et al. |

* cited by examiner

*Primary Examiner* — Harry S Hong
(74) *Attorney, Agent, or Firm* — Avaya Inc.

(57) ABSTRACT

A microprocessor executable resource monitor operable to determine that a less skilled and/or qualified resource has been assigned to service a work item or is servicing the work item, wherein a more skilled and/or qualified resource exists but is not currently available to service the work item, monitor at least one of a level of service provided by the less qualified resource to the work item and/or a customer associated with the work item and an availability of the more skilled and/or qualified resource to service the work item, and, in response to the monitoring step and while the work item is being serviced, transfer the work item to the more skilled and/or qualified resource for servicing.

21 Claims, 6 Drawing Sheets

SECRET TRANSFERS IN CONTACT CENTERS

FIELD

The present disclosure is generally directed toward communications and more specifically toward contact centers.

BACKGROUND

A contact center manages all client contacts of a business or other entity through a variety of mediums, such as telephone, fax, letter, e-mail and, increasingly, online live chat. Distinct from call centers, that purely handle telephone correspondence, contact centers have a variety of roles that combine to provide an all encompassing solution to client and customer contact. Contact centers have many different configurations.

A common type of contact center employs queues of contact center agents and work items and complex work assignment algorithms in an attempt to provide optimal customer service. For example, in skill-based queues a work item queue is paired with a corresponding resource queue. When work items are received at the Automated Contact Distributor (ACD), the attributes of the work item are analyzed, and the work item is placed in a specific queue based on its attributes. Similarly, when a contact center resource (often an agent) comes on line they are assigned to one or more resource queues that also have a corresponding skillset associated therewith. Since skill queues are provided in work item/resource pairs, the next available agent in a resource queue is assigned the next work item waiting in the work item queue. While there have been some solutions to make this queue and assignment structure more flexible, every solution has always been hampered by the notion of utilizing a number of queues.

To improve efficiency, a contact center will typically segment contacts into many different queues. This segmentation may be by service, language, media type, region, and/or customer type. This can quickly result in many thousands of queues. Each of these queues needs to be configured, managed, monitored and reported on. Also, as agents gain new skills and improve their expertise levels, there is a need to constantly reassign agents to queues. Furthermore, when an agent gains new skills there is a significant cost in administration and operational costs of the contact center. Complexity increases because agents are typically in multiple queues simultaneously, and the new skills of an agent need to be updated in all relevant queues. Updating these changes in agent skills is a time-consuming and expensive task, which usually has to be performed with some amount of manual oversight. All of these factors add significant complexity and cost to the running of the center.

To address these issues, a queueless contact center has been developed. A queueless contact center discards queues and uses pools of resources, work items and qualifier sets and creates a qualification bit map for each pool. One-to-one optimal matching of work items and resources can be achieved by determining which resources are qualified to be assigned to a selected work item, which qualified resources are eligible to be assigned to the selected work item, and which eligible resources are most suitable to be assigned to the selected work item. The bit maps can enable ultra-fast mapping to determine which of the various resources is most suitable to be assigned to the selected work item.

Contact centers often cannot achieve perfect matching. Specifically, it is often the case that a customer is not initially routed to the best agent for handling his or her contact. When the contact is a call, this is usually not a significant consideration as the customer is more concerned with receiving immediate and adequate assistance rather than waiting for the best or optimal agent to service the customer's needs. When a first agent is unable to handle a call, then the agent can transfer the call to a supervisor or some other optimal agent when such an agent becomes available. These transfers are almost always done with the customer's knowledge.

When a contact is an instant message or webchat, there is still the desire to receive immediate assistance, which means that the contact does not typically get routed to the optimal agent.

SUMMARY

These and other needs are addressed by the various aspects, embodiments, and/or configurations of the present disclosure. The present disclosure is directed to a contact center that can more effectively service contacts when compared to conventional contact centers.

This disclosure can be directed to a method/system/computer readable medium that performs the steps/operations:

(a) determining that a less skilled and/or qualified resource has been assigned to service a work item or is servicing the work item, wherein a more skilled and/or qualified resource exists but is not currently available to service the work item;

(b) monitoring one or more of a level of service provided by the less qualified resource to the work item and/or a customer associated with the work item and an availability of the more skilled and/or qualified resource to service the work item; and (c) in response to the monitoring step and while the work item is being serviced, transferring the work item to the more skilled and/or qualified resource for servicing.

This disclosure can be directed to a method/system/computer readable medium that performs the steps/operations:

(a) in a contact center, routing a contact to a bulletin board and chat room;

(b) receiving, via the bulletin board and chat room, a communication from a customer associated with the work item;

(c) determining one of a first set of skilled and/or qualified resources currently capable of responding to the communication and a second set of unskilled and/or unqualified resources currently capable of responding to the communication; and (d) enabling one or more of the first set of skilled and/or qualified resources to respond to the communication while blocking the members of the second set of unskilled and/or unqualified resources from responding to the communication.

This disclosure can be directed to a method/system/computer readable medium that performs the steps/operations:

(a) transferring a work item from a first resource to a second resource; and (b) maintaining the transfer hidden from the customer associated with the work item.

The present disclosure can provide a number of advantages depending on the particular aspect, embodiment, and/or configuration. For example, it can, particularly for pseudo-real-time contacts, provide a higher level of service and customer satisfaction by seamlessly transferring a more skilled resource when available to service the work item. Since the interaction between the agent and the customer is pseudo-real-time, transfers can be made seamlessly from the customer's perspective. It can maximize first call/contact resolution from the customer perspective. It can implement a secret transfer/conference so that the customer perception of first contact resolution is achieved, thereby resulting in improved customer satisfaction.

These and other advantages will be apparent from the disclosure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

A "blog" (a blend of the term web log) is a type of website or part of a website supposed to be updated with new content from time to time. Blogs are usually maintained by an individual with regular entries of commentary, descriptions of events, or other material such as graphics or video. Entries are commonly displayed in reverse-chronological order.

A "blogging service" is a blog-publishing service that allows private or multi-user blogs with time-stamped entries.

A "bulletin board" as used herein refers to a system that enables users to send or read electronic messages, files, and other data that are of general interest and addressed to no particular person. It can be a facility on a computer network allowing any user to leave messages that can be read by any other user, and to download software and information to the user's own computer.

The term "computer-readable medium" as used herein refers to any storage and/or transmission medium that participate in providing instructions to a processor for execution. Such a medium is commonly tangible and non-transient and can take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

The term "contact" refers to any voice, text, and/or video electronic communication, such as a voice call, E-mail, instant message, text chat, VoIP call, and the like.

The term "customer" or "client" denotes a party patronizing, serviced by, or otherwise doing business with the enterprise A "database" as used herein refers to an organized set of data held in a computer. The organization schema or model for the data can, for example, be hierarchical, network, relational, entity-relationship, object, document, XML, entity-attribute-value model, star schema, object-relational, associative, multidimensional, multivalue, semantic, and other database designs.

The terms "determine", "calculate" and "compute," and variations thereof, as used herein, are used interchangeably and include any type of methodology, process, mathematical operation or technique.

The term "electronic address" refers to any contactable address, including a telephone number, instant message handle, e-mail address, Universal Resource Locator ("URL"), Universal Resource Identifier ("URI"), Address of Record ("AOR"), electronic alias in a database, like addresses, and combinations thereof.

The terms "instant message" and "instant messaging" refer to a form of real-time text communication between two or more people, typically based on typed text. The instant message is conveyed by an instant messaging program offered by a service, such as AOL™, MSN Messenger™, Yahoo! Messenger™, Live Messenger™, and Apple's iChat™. Generally included in the instant messaging software is the ability to see the presence of another party; that is, the ability to see whether a chosen friend, co-worker or other selected person (known as a "buddy") is online and connected through the selected service. Instant messaging differs from ordinary e-mail in the immediacy of the message exchange and also makes a continued exchange simpler than sending e-mail back and forth. Instant messaging, unlike e-mail, is also generally stateless. Most exchanges are text-only, though some services now allow voice messaging, file sharing and even video chat (when both users have cameras). For instant messaging to work, both users must be online at the same time and the intended recipient must be willing to accept instant messages. An attempt to send an instant message to someone who is not online (or is offline), or who is not willing to accept instant messages, will result in a notification that the transmission cannot be completed. If the online software is set to accept instant messages, it alerts the recipient with a distinctive sound and provides a window that collectively indicates that an instant message has arrived. The window allows the recipient to accept or reject the incoming instant message. An instant message session is deemed to disconnect, or be disconnected, when the user goes offline, refuses to accept an instant message, or is suspended by the user failing to respond to an instant message after a predetermined period of time after an instant message is sent and/or received. An instant message session is deemed to be reconnected (or a call-back deemed to occur) when the user resumes the instant messaging session, such as by responding to an outstanding instant message.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element. Also, while the disclosure is presented in terms of exemplary embodiments, it should be appreciated that individual aspects of the disclosure can be separately claimed.

The terms "online community", "e-community", or "virtual community" mean a group of people that primarily interact via a computer network, rather than face to face, for social, professional, educational or other purposes. The interaction can use a variety of media formats, including wikis, blogs, chat rooms, Internet forums, instant messaging, email, and other forms of electronic media. Many media formats are used in social software separately or in combination, including text-based chatrooms and forums that use voice, video text or avatars.

"Pseudo-Real-Time Contacts" as used herein refer to contacts in which the contacting entity or customer is unable to abandon or disconnect the contact. Common examples include e-mail, fax, electronic or paper documents, webform submissions, voice messages, text-chat, instant messages, blogs, webchat, social network messages, and the like. Typically, a pseudo-real-time contact is a text-based communication.

"Real-Time Contacts" as used herein refer to contacts in which the contacting entity or customer is present during the waiting (or queuing) period and can choose to abandon or disconnect the contact if the call is not serviced within an acceptable period. Common examples include voice calls, VoIP, video calls, and the like.

The term "social network service" is a service provider that builds online communities of people, who share interests and/or activities, or who are interested in exploring the interests and activities of others. Most social network services are web-based and provide a variety of ways for users to interact, such as e-mail and instant messaging services.

The term "social network" refers to a web-based social network.

The term "online chat" or "webchat" as used herein refers to any direct text-based and/or video-based (e.g., webcams), one-on-one chat or one-to-many group chat (formally also known as synchronous conferencing), using tools such as instant messengers, Internet Relay Chat (IRC), talkers and MUDs. Webchat typically offers a real-time direct transmission of text-based messages from sender to receiver, hence the delay for visual access to the sent message shall not hamper the flow of communications in any of the directions. Online chat may address point-to-point communications as well as multicast communications from one sender to many receivers and voice and video chat, or may be a feature of a web conferencing service. Online chat includes web-based applications that allow communication—often directly addressed, but anonymous between users in a multi-user environment. Web conferencing is a more specific online service, that is often sold as a service, hosted on a web server controlled by the vendor.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

DETAILED DESCRIPTION

The Contact Center

Figure 1:
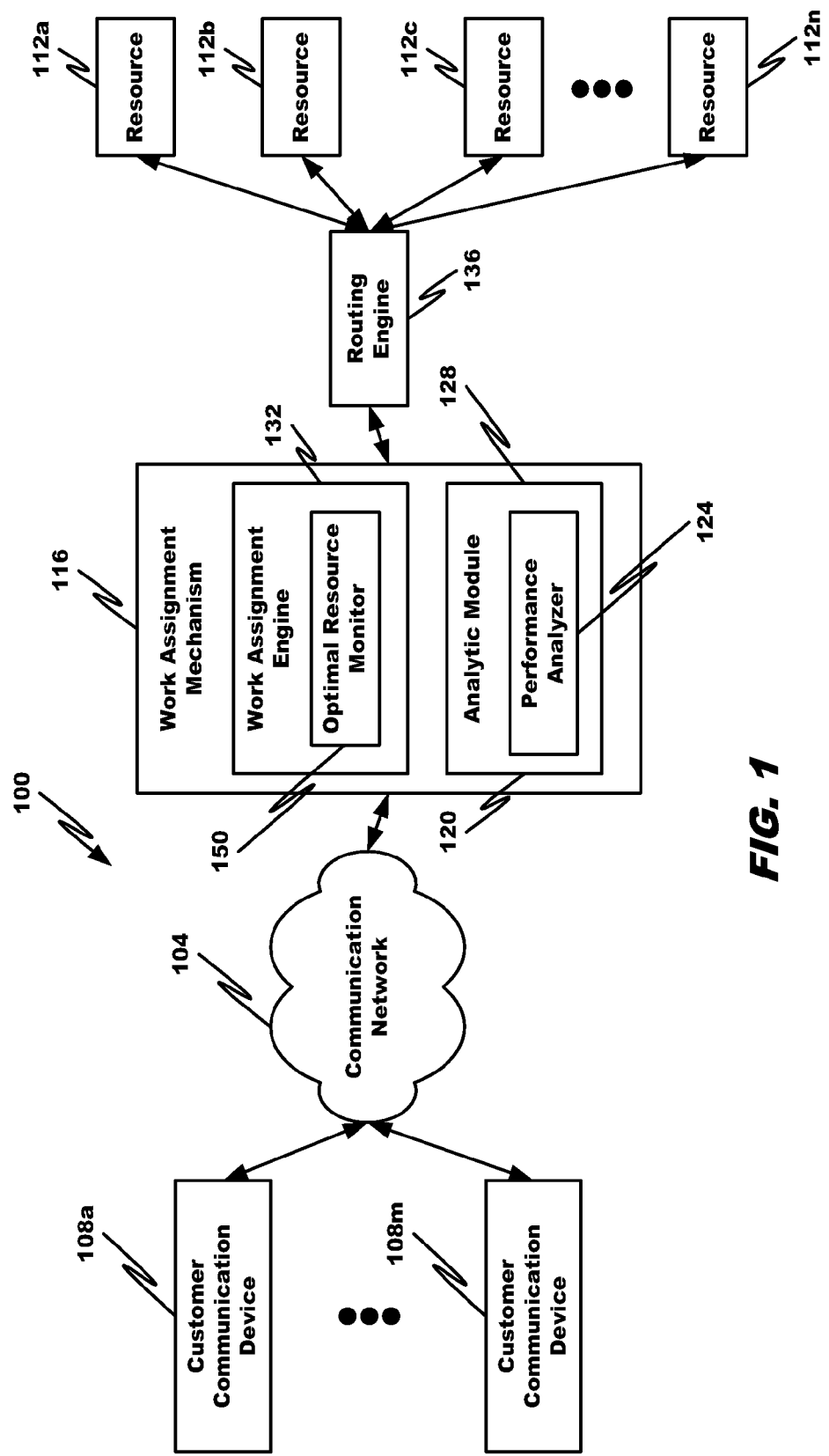
FIG. 1 is a block diagram of a communication system in accordance with embodiments of the present disclosure.

FIG. 1 shows an illustrative embodiment of a communication system 100 in accordance with at least some embodiments of the present disclosure. The communication system 100 may be a distributed system and, in some embodiments, comprises a communication network 104 connecting one or more communication devices 108a-m to a work assignment mechanism 116, which may be owned and operated by an enterprise administering a contact center in which a plurality of resources 112a-n are distributed to handle incoming work items (in the form of contacts) from the customer communication devices 108a-m.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes and Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Voice over Internet Protocol (VoIP) network, a Session Initiation Protocol (SIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser. No. 12/469,523 to Steiner, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

The communication devices 108a-m may correspond to customer communication devices. In accordance with at least some embodiments of the present disclosure, a customer may utilize their communication device 108a-m to initiate a work item, which is generally a request for a processing resource 112a-n. Exemplary work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating work items based thereon are described in U.S. patent application Ser. Nos. 12/784,369, 12/706,942, and 12/707,277, filed Mar. 20, 1010, Feb. 17, 2010, and Feb. 17, 2010, respectively, each of which are hereby incorporated herein by reference in their entirety.

The work assignment mechanism 116 may employ any queue-based or queueless work assignment algorithm. Examples of queue-based work assignment skill-based algorithms include, without limitation, a fairness algorithm, pacing algorithm (which inserts rests into the agents work queue), value-based algorithms, limited algorithms (such as Business Advocate™ by Avaya, Inc.), and outsourcing algorithms. Other algorithms may consider other types of data inputs and/or may treat certain data inputs differently.

The format of the work item may depend upon the capabilities of the communication device 108a-m and the format of the communication. In particular, work items are logical representations within a contact center of work to be performed in connection with servicing a communication received at the contact center (and more specifically the work assignment mechanism 116). The communication may be received and maintained at the work assignment mechanism 116, a switch or server connected to the work assignment mechanism 116, or the like until a resource 112a-n is assigned to the work item representing that communication at which point the work assignment mechanism 116 passes the work item to a routing engine 136 to connect the communication device 108a-m which initiated the communication with the assigned resource 112a-n.

Although the routing engine 136 is depicted as being separate from the work assignment mechanism 116, the routing engine 136 may be incorporated into the work assignment mechanism 116 or its functionality may be executed by the work assignment engine 132.

In accordance with at least some embodiments of the present disclosure, the communication devices 108a-m may comprise any type of known communication equipment or collection of communication equipment. Examples of a suitable communication device 108a-m include, but are not limited to, a personal computer, laptop, Personal Digital Assistant (PDA), cellular phone, smart phone, telephone, or combinations thereof. In general each communication device 108a-m may be adapted to support video, audio, text, and/or data communications with other communication devices 108a-m as well as the processing resources 112a-n. The type of medium used by the communication device 108a-m to communicate with other communication devices 108a-m or processing resources 112a-n may depend upon the communication applications available on the communication device 108a-m.

In accordance with at least some embodiments of the present disclosure, the work item is sent toward a collection of processing resources 112a-n via the combined efforts of the work assignment mechanism 116 and routing engine 136. The resources 112a-n can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the work assignment mechanism 116 and resources 112a-n may be owned and operated by a common entity in a contact center format. In some embodiments, the work assignment mechanism 116 may be administered by multiple enterprises, each of which has their own dedicated resources 112a-n connected to the work assignment mechanism 116.

Work Assignment Engine 132 and Analytic Module 128

In some embodiments, the work assignment mechanism 116 comprises a work assignment engine 132 which enables the work assignment mechanism 116 to make intelligent routing decisions for work items. In some embodiments, the work assignment engine 132 is configured to administer and make work assignment decisions in a queueless contact center, as is described in U.S. patent application Ser. No. 12/882,950, the entire contents of which are hereby incorporated herein by reference.

More specifically, the work assignment engine 132 can determine which of the plurality of processing resources 112a-n is qualified and/or eligible to receive the work item and further determine which of the plurality of processing resources 112a-n is best suited (or is the optimal processing resource) to handle the processing needs of the work item. In situations of work item surplus, the work assignment engine 132 can also make the opposite determination (i.e., determine optimal assignment of a work item resource to a resource). In some embodiments, the work assignment engine 132 is configured to achieve true one-to-one matching by utilizing bitmaps/tables and other data structures.

The work assignment engine 132 includes an optimal resource monitor 150 which attempts to maximize the first call/contact resolution rate in those situations where a sub-optimal resource (or "best available" resource rather than the optimal resource) is assigned to service a contact (particularly a pseudo-real-time contact) by transferring, when appropriate, the selected contact to a resource that is better skilled, equipped, qualified, and/or suited to service the selected contact when the resource becomes available. The transfer can be performed such that the customer is unaware that his or her contact has been transferred to another resource for servicing. As far as the customer knows, he or she is still communicating with the initially assigned resource. This creates the illusion to the customer that his or her contact has been routed to a single very knowledgeable agent, when, in fact, the selected contact could have been handled by multiple agents.

While the "optimal resource" is used in connection with the discussion of the optimal resource monitor 150, it is to be understood that "optimal resource" refers not only to the resource which, among all resources, is best skilled, equipped, qualified, and/or suited to service a selected contact and/or customer but also to the set of resources that are more skilled, equipped, qualified, and/or suited to service the selected contact and/or customer when compared to the resource initially assigned to service and/or is currently servicing the contact. The optimal resource monitor 150, in effect, monitors a selected contact that is assigned a less than optimal resource and, when appropriate, transfers a more skilled, equipped, qualified, and/or suited to service the selected contact to increase a level of customer satisfaction and decrease levels of repeated contacts by the same customer to service a common need.

When the contact is a pseudo-real-time contact, the fact of the resource transfer can be maintained in secrecy from the customer by maintaining a common screen name for the resource from the customer's perspective. That is, the customer is provided with the same screen name for both the first and second resources even though the first and second resources are different and service the selected contact at different times. This can be done, for example, by spoofing resource identification and/or creating a session identifier (viewable by the display provided to the customer) and associating the session identifier with each and every resource that helps service the selected contact (on the back end or contact center side to facilitate resource evaluation by the analytic module 128 (discussed below). When the selected contact is transferred, the transfer mechanism described in copending U.S. patent application Ser. No. 13/172,098, filed, Jun. 29, 2011 entitled "Methods and Systems for Incorporating a Third User Into an Instant Message Session", now U.S. Pat. No. 8,909,718, which is incorporated herein by this reference.

The optimal resource monitor 150, upon identifying sub-optimal contact routing, can maintain the contacts, even while being serviced by a sub-optimal resource, in a monitoring queue to enable subsequent routing and transfers to a more optimal resource.

Figure 2:
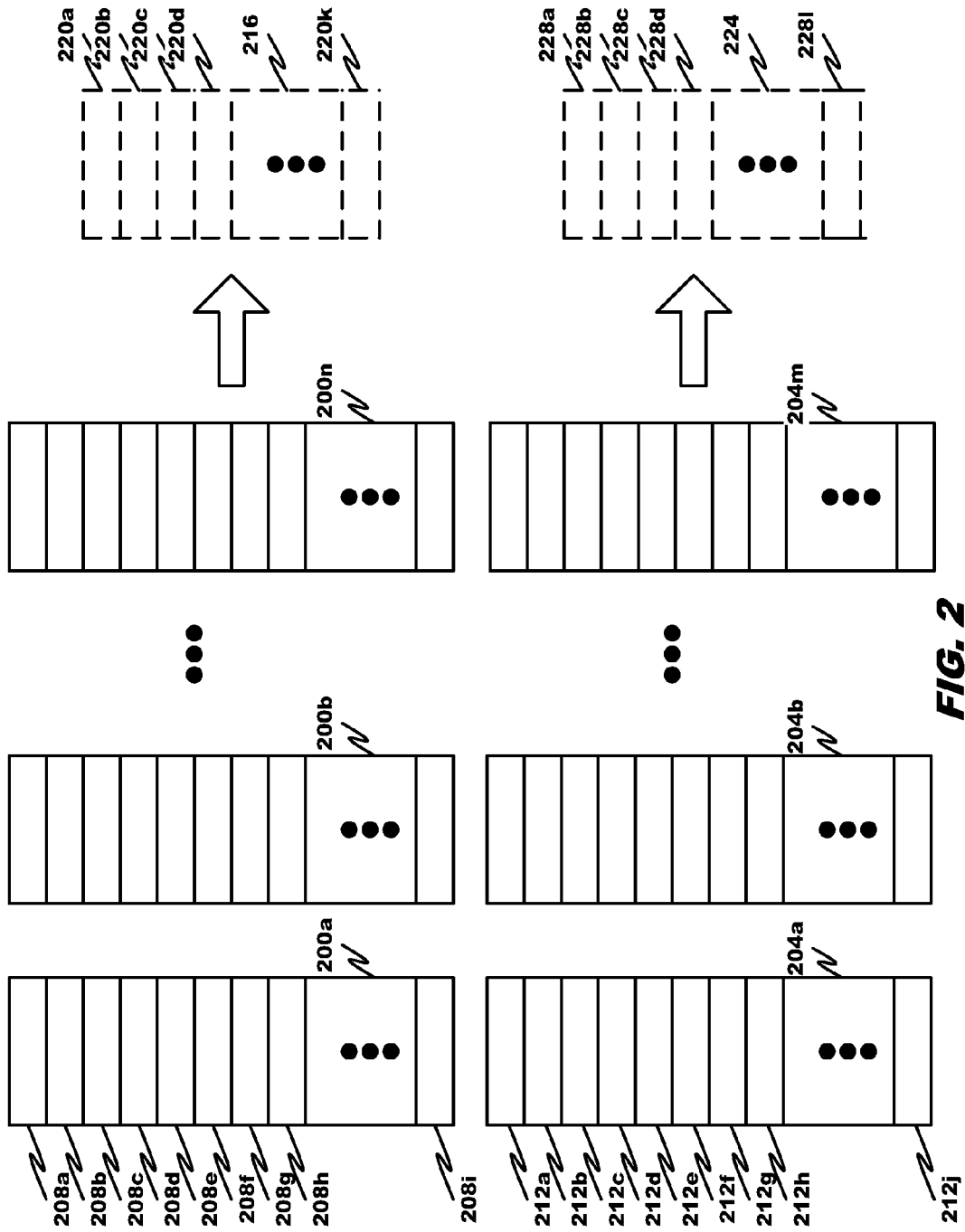
FIG. 2 depicts queue configurations in accordance with embodiments of the present disclosure.

With reference to FIG. 2, plural work item and resource queues 200a-n and 204a-m are illustrated. The various work item queues 200a-n conventionally serve and hold contacts for a different work type and/or for real-versus pseudo-real-time contacts. Each queue 200a-n holds contacts of a different priority and/or different type (e.g., e-mail, fax, electronic or paper documents, webform submissions, voice messages, voice calls, VoIP calls, text chat, video calls, instant messages, and the like). This segmentation may be by service, language, media type, region, and/or customer type. The priority of a contact is determined according to well known predefined criteria. Each queue normally functions as a first-in, first-out (FIFO) buffer memory, and includes Each work item queue 200a-n includes plural queue positions or slots 208a-p (each for identifying a corresponding one enqueued contact), with queue position or slot 208a being at the head of the queue (which is considered to be position 1) and 208p being at the tail of the queue (which is considered to be at the last queue position). Each resource queue 204a-m also has multiple queue positions or slots 212a-j and corresponds to a different set of agent skills. Each resource's skills are prioritized according to his or her level of expertise in that skill, and either agents are enqueued in individual ones of agent queues 204a-m in their order of expertise level and/or are enqueued in different ones of a plurality of agent queues 204a-m that correspond to a skill and each one of which corresponds to a different expertise level. Contacts incoming to the contact center are assigned, such as by a work item vector, to different work item queues 200a-n based upon one or more work item qualifiers. As used herein, a qualifier (such as those referenced below) refers to an attribute assigned to a contact that determines, at least in part, to which work item queue 200a-n the corresponding contact is forwarded (or to which class of service the contact is assigned). Resources who are available for handling contacts are assigned to resource queues 204a-m based upon the skills that they possess. A resource may have multiple skills, and hence may be assigned to multiple agent queues 204a-m simultaneously. Furthermore, an agent may have different levels of skill expertise (e.g., skill levels 1-N in one configuration or merely primary skills and secondary skills in another configuration), and hence may be assigned to different resource queues 204a-m at different expertise levels.

For example, in skill-based queues a work item queue is paired with a corresponding resource queue. When work items are received at the Automated Contact Distributor (ACD), the attributes of the work item are analyzed, and the work item is placed in a specific queue based on its attributes. Similarly, when a contact center resource (often a human agent) comes on line they are assigned to one or more resource queues that also have a corresponding skillset associated therewith. Since skill queues are provided in work item/resource pairs, the next available resource in a resource queue is assigned the next work item waiting in the work item queue. While there have been some solutions to make this queue and assignment structure more flexible, every solution has always been hampered by the notion of utilizing a number of queues.

When a work item has been assigned to a sub-optimal resource, a description and/or link to a description of the work item is placed in a position or slot 220a-k in an optional work item monitoring queue 216, and, one or more optimal resources may be placed in one or more positions or slots 228a-l in an optional resource monitoring queue 224. In some configurations, link(s) to the corresponding optimal resource(s) are placed in each enqueued work item queue position 220a-k and/or link(s) to the corresponding work item(s) for which the resource is optimal are placed in each enqueued resource queue position 228a-l. In one configuration, only one of the work item and resource monitoring queues 216 and 224 are employed. When a resource becomes available, the optimal resource monitor 150 identifies each of the work items for which the resource was identified as being optimal and, based on contact center information and performance metrics relating to each work item, selects a work item to which to assign the resource. This determination can be based, for example, on a relatively quality of service each work item is currently receiving, the comparative closeness of the match each sub-optimal resource currently servicing each work item to the needs of the work item, the perceived value of each work item and/or associated customer, the current amount of service that has already been provided to each work item, and the like.

These techniques may be employed in a conference or bulletin board-type environment. An instant message and/or webchat customer can be routed to a bulletin board dedicated to his or her contact, and a resource can be allowed access to the bulletin board if he or she is assigned to the contact. Multiple resources can be assigned to the bulletin board either simultaneously and/or as each resource becomes available (e.g., to accommodate the initial sub-optimal routing condition). Resources can be made aware of other resources responding and/or preparing to respond to the customer's instant message and/or webchat on the bulletin board. In some instances, only one resource at a time may be allowed to prepare a response. Thus, if one acceptable or eligible agent were to begin preparing a response to a bulletin board instant message and/or webchat, then all other resources, whether acceptable or unacceptable and/or eligible or ineligible, that are viewing the same bulletin board can be blocked from responding, but still be allowed to view the interaction and, possibly, create a response to a later customer question on the same instant message and/or webchat. The acceptability and/or eligibility of the resource is determined typically by whether the resource is considered to be optimal or suboptimal to service the customer and/or instant message and/or web chat.

The work assignment engine 132 and its various components may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users.

In addition to comprising the work assignment engine 132, the work assignment mechanism 116 may also comprise an analytic module 120. The analytic module 120 may comprise a performance analyzer 124 to collect and analyze contact center information and determine historical and/or real time performance measures. The analytic module 120 can be a modified form of IQ™, Operational Analyst™, Contact Flow Analytics™, Desktop Wallboard™, Avaya Aura® Performance Center™, Enterprise Work Assignment™, and/or Avaya Aura® Workforce Optimization™, all by Avaya, Inc.

The performance analyzer 124 collects and analyzes contact center information and, based on the analyzed contact center information, determines historical and/or real time performance measures. Contact center information includes one or more of contact type code, media code (which identifies the type of media/medium used during the contact), contact ID (which uniquely identifies the contact), state ID (which identifies the state of the corresponding monitored endpoint to which the contact part corresponds), contact media interaction start datetime (the date/time that the contact media interaction started), party ID, business role code, party role start datetime, wait treatment ID, active media mask (a mapping of possible media types and their direction), UCID (Universal Call Identifier), contact datetime started (the date/time that the contact started), contact datetime stopped (the date/time that the contact stopped), observing call flag, trunk ID, contact routing method code, contact purpose code, routing construct ID, contact subject (a text description of the subject of the message), contact participation group ID, contact direction code, queue priority, data source ID, contact control indicator, state reason ID, calling number ID (the number dialed by the originator of the contact), and dialed number purpose ID. Performance measures include blockage (which indicates what percentage of customers will not be able to access the center at a given time due to insufficient network facilities in place), abandon rate (which measure the number of abandons as well as the abandon rate since both correlate with retention and revenues), service level and/or ASA (which is the percentage of contacts that are answered in a defined wait threshold, the most common speed of answer measure in the contact center, and most commonly stated as x percent of contacts handled in y seconds or less, while average speed of answer (ASA) represents the average wait time of all contacts in the period), first contact resolution rate (which is the percentage of transactions that are completed within a single contact, often called the "one and done" ratio or first contact resolution (FCR) rate, can be an important measure of quality, and gauges the ability of the center, as well as of an individual, to accomplish an interaction in a single step without requiring a transfer to another person or area, or needing another transaction at a future time to resolve the customer issue), transfer rate (which can be expressed as the transfer percentage and is an indication of how many contacts have to be transferred to another person or place to be handled), communication skills (which is degree to which general communications skills and etiquette are displayed by a resource and generally measured via observation or some form of quality monitoring as an individual gauge of performance), adherence to procedures (which measures a resource's adherence to procedures such as workflow processes or contact scripts), agent occupancy (which is a measure of actual time busy on customer contacts compared to available or idle time, is calculated by dividing workload hours by staff hours, and can be an important measure of how well the contact center has scheduled its staff and how efficiently resources are being used (e.g., if occupancy is too low, agents are sitting around idle with not enough to do and, if occupancy is too high, the personnel may be overworked)), AHT/ACW (which is a common measure of contact handling, the average handle time (AHT), made up of talk time plus after-contact work (ACW), and, to accommodate differences in contact patterns, normally measured and identified by time of day as well as by day of week), conversion rate (which refers to the percentage of transactions in which a sales opportunity is translated into an actual sale and can be measured as an absolute number of sales or as a percentage of contacts that result in a sale), average, expected, predicted, estimated, and/or actual wait time (of a work item for servicing), number of contacts accepted by an agent over a selected period of time, percentage utilization of a contact center resource, percentage realization of a contact center policy and/or goal, customer satisfaction (which is a measure of how satisfied a customer is with service previously or currently being provided), and up-sell/cross-sell rate (which refers to cost per contact or cost per minute to handle the contact workload). The foregoing contact center information and performance metrics can be used as qualifiers in assigning resources to service work items. As will be appreciated, this is not an exhaustive list, and other types of contact center information and/or performance metrics may also be employed. Any of the contact center information and/or performance metrics can be expressed as a percent realization compared to contact center goals, policies, and/or thresholds for the type of contact center information and/or performance metric.

The performance analyzer 124 can monitor a resource's (such as the initially assigned sub-optimal resource) interaction with the customer and determine if the resource is handling or servicing the contact satisfactorily. If the first (or sub-optimal) resource is actually handling or servicing the contact well (e.g., performance metrics are being satisfied and customer service is determined to be adequate), then it may not be necessary to transfer the contact to a different more optimal resource when such a resource becomes available. Likewise, in the bulletin board implementation, the first resource to respond may be allowed to continue responding unless and until it is determined by the performance analyzer 124 that the first agent requires assistance. Restricting the number of resources that interact with a customer can be desirable to maintain a conversational flow and substantially minimize transitions on the resource side. It can also provide higher levels of contact center operational efficiency.

Contact Center Operation

Figure 3:
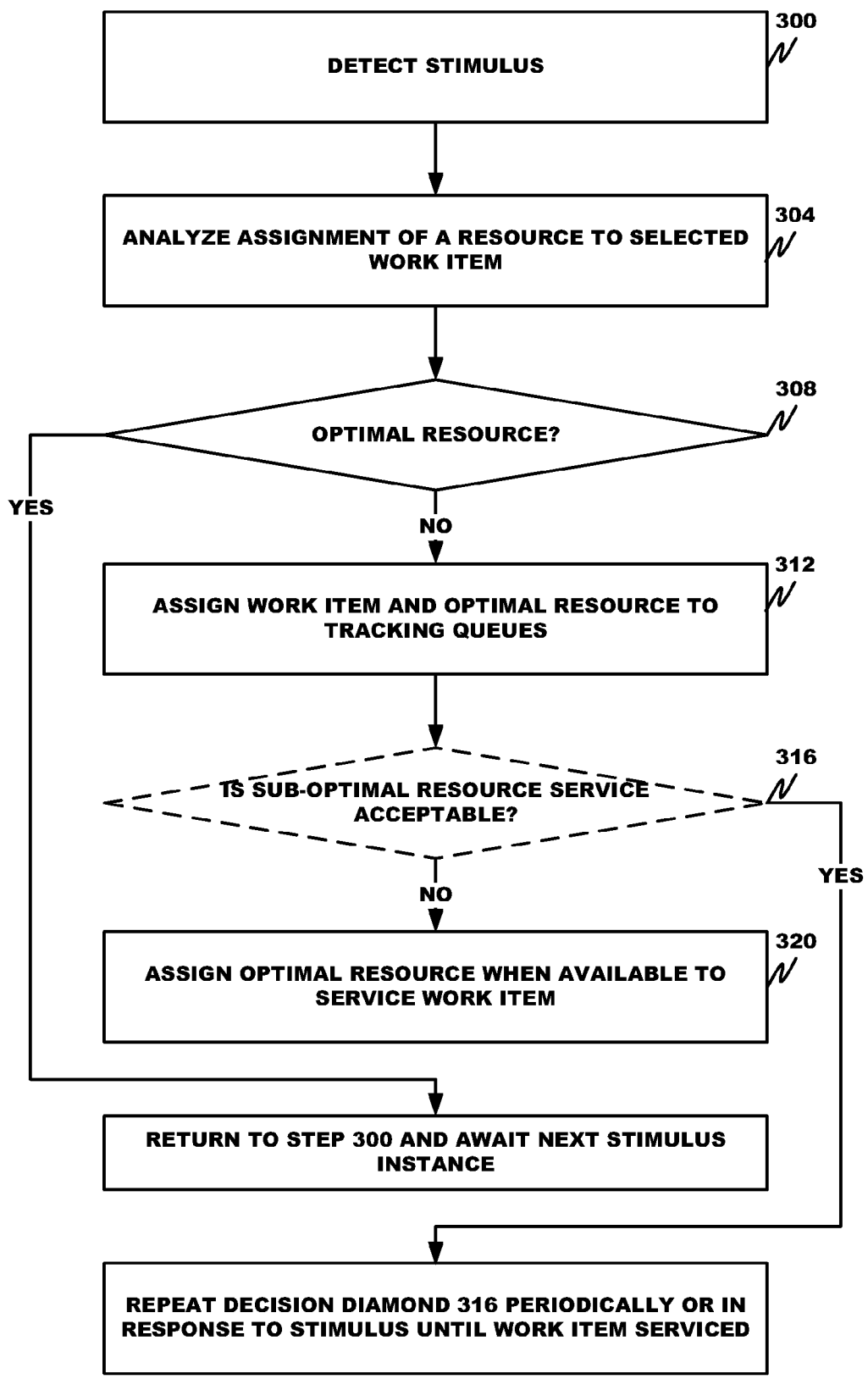
FIG. 3 depicts a flow diagram in accordance with embodiments of the present disclosure.

Referring to FIG. 3, operation of the optimal resource monitor 150 will be discussed.

In step 300, the optimal resource monitor 150 detects a stimulus. Exemplary stimuli include assignment by the work assignment mechanism 116 of a work item, particularly a pseudo-real-time contact, to a resource for service. The type of work item is generally indicated by one or more of contact type code, media code (which identifies the type of media/medium used during the contact), and/or contact ID (which uniquely identifies the contact).

In step 304, the optimal resource monitor 150 analyzes the assignment of a resource to a selected contact. Analysis involves collection of relevant contact center information regarding the selection, by the work assignment mechanism 116, of the resource to service the contact. The contact center information typically includes the identities of the various resources skilled, equipped, qualified, and/or suited to service the contact, the relative score or metric related to the level of skill and/or qualification of each resource to service the needs of the contact, a reason why more skilled and/or qualified resources, if any, were not selected to service the contact, a reason why the selected resource was assigned to service the contact, and other factors used by the work assignment mechanism 116 in the assignment decision.

In step 308, the optimal resource monitor 150 determines whether an optimal (or more skilled, equipped, and/or qualified and/or better suited) resource was not assigned to service the selected contact.

If the optimal resource was assigned to service the selected contact, the optimal resource monitor 150 returns to step 300 and awaits the next stimulus instance.

Figure 6:
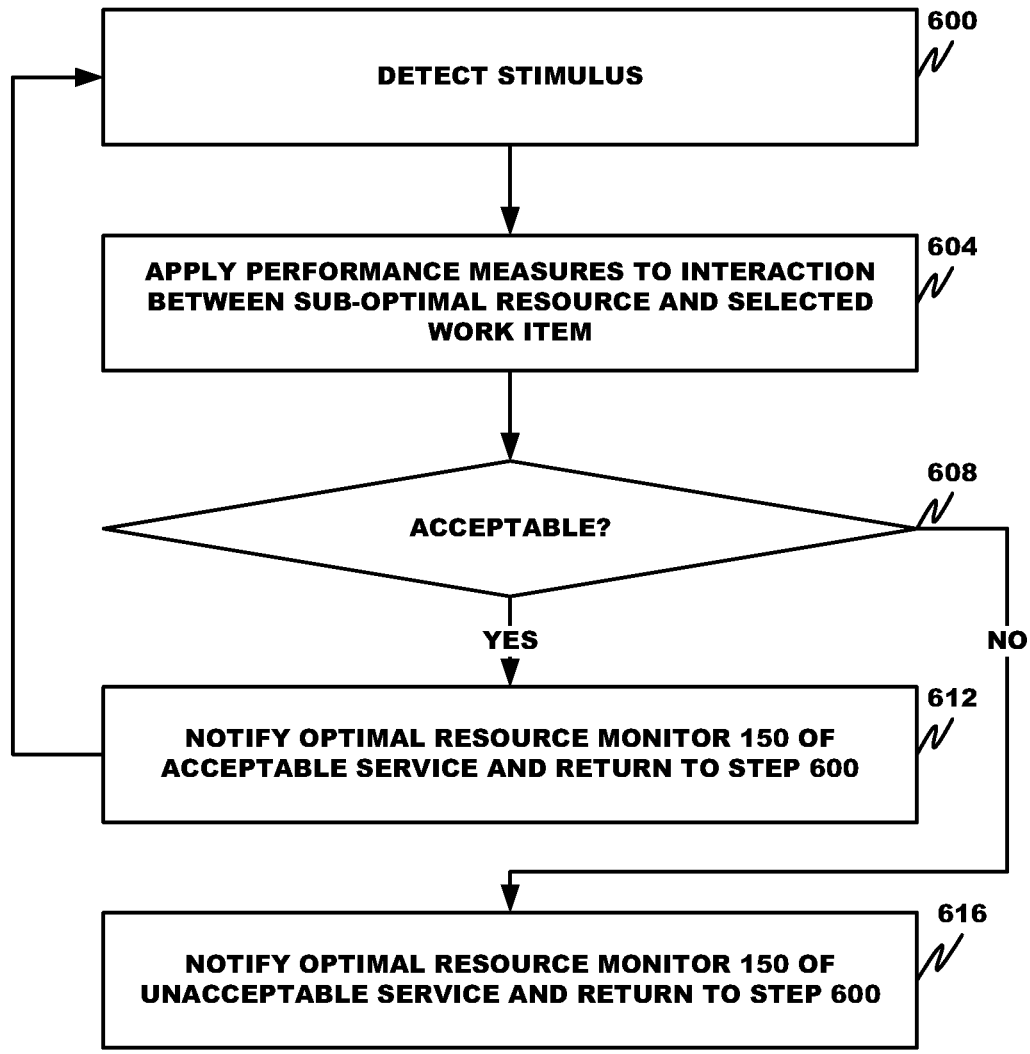
FIG. 6 depicts flow diagram in accordance with embodiments of the present disclosure.

If there is an optimal resource that was not assigned to service the selected contact, control may pass to optional decision diamond step 316 to determine whether the service provided by the sub-optimal resource to service the work item is acceptable. With reference to FIG. 6, this determination is made by the performance analyzer 124. The performance analyzer 124 initiates the process by detecting a stimulus (block 600), such as a request by the optimal resource monitor 150. The performance analyzer 124 applies performance measures to the interaction between the sub-optimal resource and the selected work item (block 604) and determines whether the performance measures are acceptable (e.g., satisfy predetermined thresholds and/or rules and/or policies) (decision diamond 608). If the interaction is an acceptable level of service, the performance analyzer notifies the optimal resource monitor 150 of the acceptable service and returns to step 600 (block 612). If the interaction constitutes an unacceptable level of service, the performance analyzer notifies the optimal resource monitor 150 of the unacceptable level of service and returns to step 600 (block 616).

Returning to FIG. 3, the optimal resource monitor 150, based on input from the performance analyzer 124, determines whether the sub-optimal resource is providing an acceptable level of service (decision diamond 316). When the interaction between the sub-optimal resource and the work item is an acceptable level of service, the optimal resource monitor 150 repeats decision diamond 316 periodically or in response to other stimulus (such as an interrupt from the performance analyzer 124 indicating an unacceptable level of service is now being provided) until the selected work item is serviced. When the interaction between the sub-optimal resource and the work item is an unacceptable level of service, the optimal resource monitor 150 assigns an optimal resource to service the work item when the optimal resource becomes available to service the work item (block 320). Alternatively, when the optimal resource is unavailable and depending on the severity of the deficient service and/or value of the contact and/or customer the optimal resource monitor 150 can select an available more optimal, but not optimal, resource to service the work item and request an immediate transfer to the more optimal resource.

Figure 4:
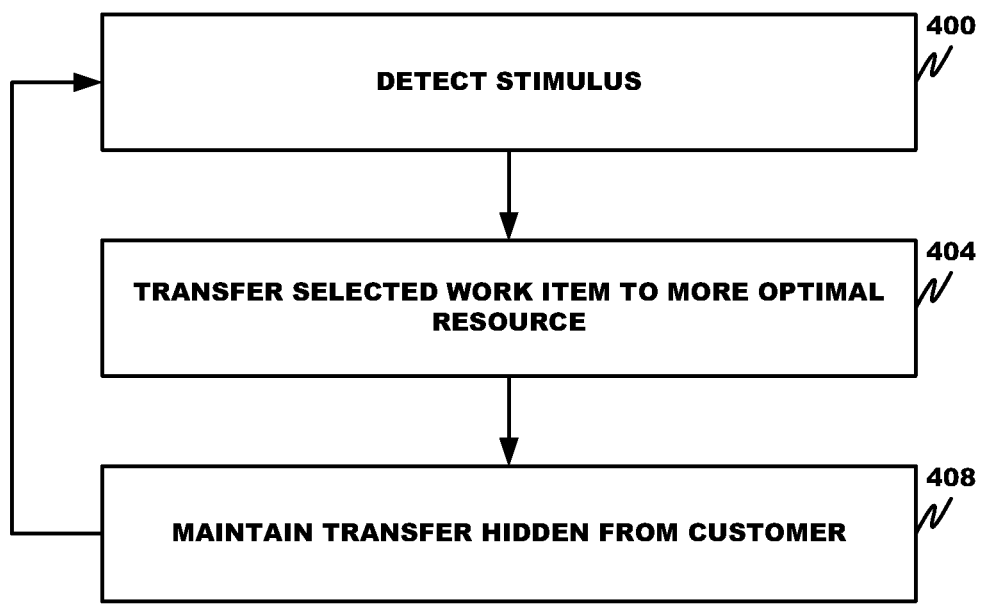
FIG. 4 depicts flow diagram in accordance with embodiments of the present disclosure.

Referring now to FIG. 4, more detail is provided regarding the operation of the optimal resource monitor 150 in block 320.

The work assignment mechanism 116 detects a stimulus (block 400), such as an interrupt or request from the optimal resource monitor 150 to transfer a selected (more optimal) resource to service a selected work item. The work assignment mechanism 116 transfers the work item to a more optimal or optimal resource (block 404) while maintaining the transfer hidden from the customer (block 408).

Figure 5:
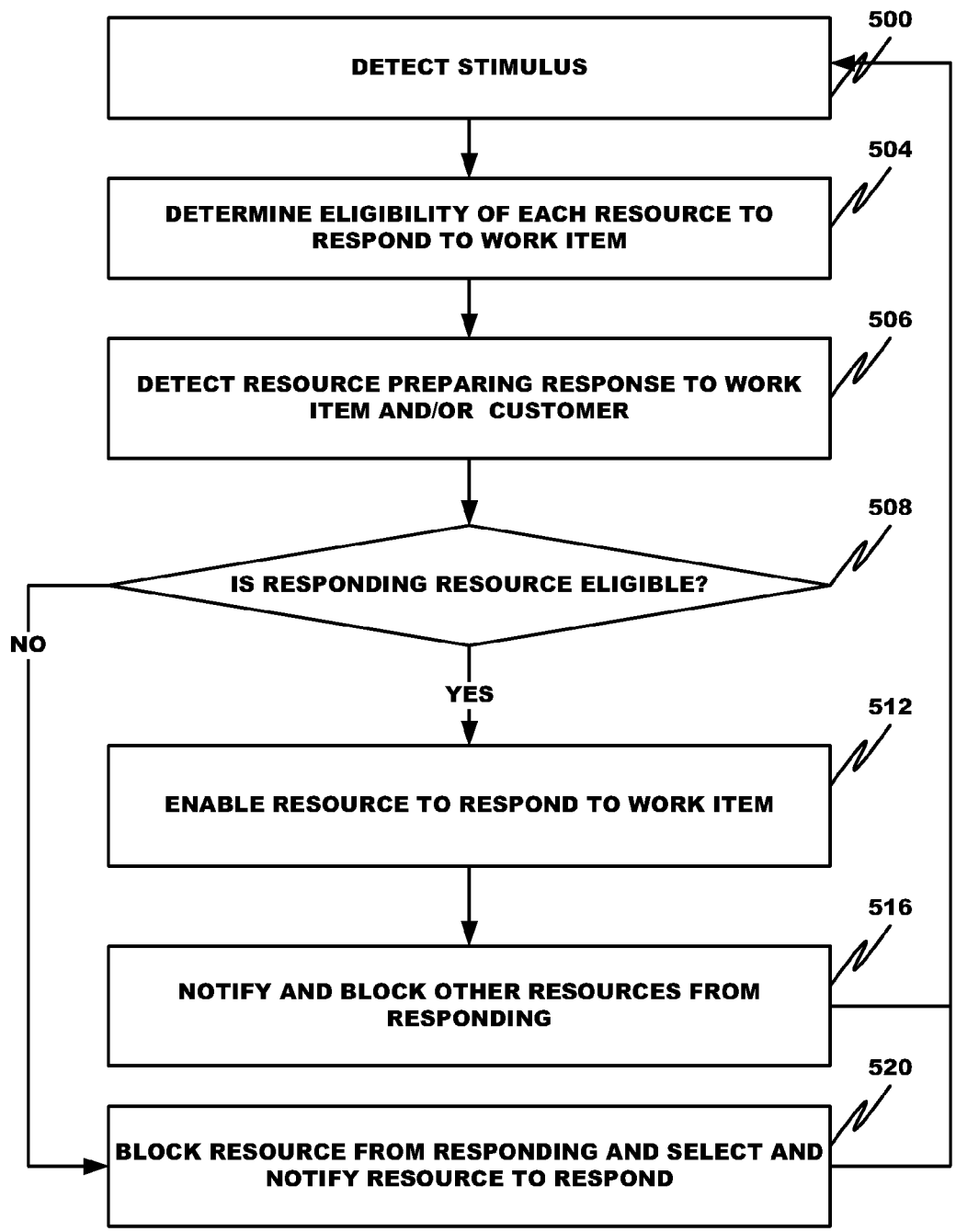
FIG. 5 depicts flow diagram in accordance with embodiments of the present disclosure.

Referring now to FIG. 5, operation of a bulletin board, chat room, and/or blog by a work assignment mechanism 116 is discussed.

The work assignment mechanism 116 detects a stimulus (block 500), such as posting of content by a customer, receipt of a customer instant message or online chat, and the like.

The work assignment mechanism 116 determines the eligibility (e.g., skills and/or qualifications) of each resource currently capable to responding to the work item and/or associated customer (block 504).

The work assignment mechanism 116 detects a resource responding to the work item and/or associated customer (block 506) and, in response, determines whether the responding resource is eligible to respond (decision diamond 508).

When the responding resource is eligible to respond to the work item and/or associated customer, the work assignment mechanism 116 enables the resource to respond (block 512) and blocks other currently capable resources from responding (block 516). This can be done by notifying the other resources not to respond, preventing responses of other resources from being presented to the work item and/or associated customer, disabling the computational devices of the other resources, and the like.

When the responding resource is ineligible to respond to the work item and/or associated customer, the work assignment mechanism 116 blocks the resource from responding and selects and notifies an eligible resource to respond to the work item and/or associated customer (block 520).

In an alternative process configuration, the work assignment mechanism 116, rather than waiting for a resource to attempt to respond (which can be inefficient), can, in block 506, select a resource to respond to the work item and/or associated customer and block other resources. In that event, block 506 would be performed in lieu of decision diamond 508.

The exemplary systems and methods of this disclosure have been described in relation to contact or interaction centers. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a server, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

For example while the disclosure has been described primarily with reference to a queue-based contact center, it may be applied to a queueless contact center. A queueless contact center discards queues and uses pools of resources, work items and qualifier sets and creates a qualification bit map for each pool. One-to-one optimal matching of work items and resources can be achieved by determining which resources are qualified to be assigned to a selected work item, which qualified resources are eligible to be assigned to the selected work item, and which eligible resources are most suitable to be assigned to the selected work item. The bit maps can enable ultra-fast mapping to determine which of the various resources is most suitable to be assigned to the selected work item.

In another alternative embodiment, the techniques described herein are applied to a grid-based contact center where the workload is distributed across everything, as described in US Patent Application No. 2010/0296417, which is incorporated herein by this reference.

In yet another alternative embodiment, the transfer feature is implemented in a traditional fashion where the initial resource transfers the contact to another resource (e.g., supervisor or subject-matter expert). However, the fact of the transfer and identity of the new resource are kept secret from the customer.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized. In this system, the monitoring queues 216 and/or 224 would be replaced by bitmaps in the same manner as the work item and resource queues 200a-n and 204a-m.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure.

Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   determining, by a microprocessor executable resource monitor, that a less skilled and/or qualified resource has been assigned to service a work item or is servicing the work item, wherein a more skilled and/or qualified resource exists but is not currently available to service the work item;
   monitoring, by the resource monitor, at least one of a level of service provided by the less qualified resource to the work item and/or a customer associated with the work item and an availability of the more skilled and/or qualified resource to service the work item; and
   in response to the monitoring step and while the work item is being serviced, transferring, by the resource monitor, the work item to the more skilled and/or qualified resource for servicing.

2. The method of claim 1, wherein the transfer of the more skilled and/or qualified resource is hidden from the customer associated with the work item.

3. The method of claim 1, wherein the work item is a pseudo-real-time contact and wherein the less and more skilled and/or qualified resources are human agents.

4. The method of claim 2, wherein the customer is presented with a screen name common to both the less and more skilled and/or qualified resources.

5. The method of claim 4, wherein the resource monitor spoofs identifications of the less and more skilled and/or qualified resources.

6. The method of claim 4, wherein the resource monitor creates a session identification for the servicing of the work item and associating the session identification with both the less and more skilled and/or qualified resources.

7. The method of claim 1, further comprising:
   maintaining, by the resource monitor and while the work item is being serviced by the less skilled and/or qualified resource, the work item in a tracking queue separate from a queue for work items awaiting servicing.

8. The method of claim 1, wherein the monitoring step monitors a level of service provided by the less qualified resource to the work item and/or a customer associated with the work item and transfers the work item to the more skilled and/or qualified resource for servicing when the level of service is unacceptable.

9. A non-transient, tangible computer readable medium comprising microprocessor executable instructions that, when executed, perform the steps of claim 1.

10. A system, comprising:
    a microprocessor executable resource monitor operable to:
    determine that a less skilled and/or qualified resource has been assigned to service a work item or is servicing the work item, wherein a more skilled and/or qualified resource exists but is not currently available to service the work item;
    monitor at least one of a level of service provided by the less qualified resource to the work item and/or a customer associated with the work item and an availability of the more skilled and/or qualified resource to service the work item; and
    in response to the monitoring step and while the work item is being serviced, transfer the work item to the more skilled and/or qualified resource for servicing.

11. The system of claim 10, wherein the transfer of the more skilled and/or qualified resource is hidden from the customer associated with the work item.

12. The system of claim 10, wherein the work item is a pseudo-real-time contact and wherein the less and more skilled and/or qualified resources are human agents.

13. The system of claim 11, wherein the customer is presented with a screen name common to both the less and more skilled and/or qualified resources.

14. The system of claim 13, wherein the resource monitor spoofs identifications of the less and more skilled and/or qualified resources.

15. The system of claim 13, wherein the resource monitor creates a session identification for the servicing of the work item and associating the session identification with both the less and more skilled and/or qualified resources.

16. The system of claim 10, wherein the resource monitor is further operable to:
maintain, while the work item is being serviced by the less skilled and/or qualified resource, the work item in a tracking queue separate from a queue for work items awaiting servicing.

17. The system of claim 10, wherein the monitoring operation monitors a level of service provided by the less qualified resource to the work item and/or a customer associated with the work item and transfers the work item to the more skilled and/or qualified resource for servicing when the level of service is unacceptable.

18. A method, comprising:
in a contact center, routing, by a work assignment mechanism connected to at least one communication device by a communication network, a contact to at least one of a bulletin board and chat room;
receiving, via the communication network by the work assignment mechanism and via the at least one of a bulletin board and chat room, a communication from a customer associated with the work item;
determining, by the work assignment mechanism, at least one of a first set of skilled and/or qualified resources currently capable of responding to the communication and a second set of unskilled and/or unqualified resources currently capable of responding to the communication; and
enabling at least one of the first set of skilled and/or qualified resources to respond, via the at least one communication device, to the communication while blocking the members of the second set of unskilled and/or unqualified resources from responding to the communication.

19. A method, comprising:
transferring, by a work assignment mechanism connected to a first communication device and a second communication device by a communication network, a work item from a first resource utilizing the first communication device to a second resources utilizing the second communication device;
maintaining, by the work assignment mechanism, the transfer hidden from the customer associated with the work item; and
wherein the work item is a pseudo-real-time contact, wherein the first and second resources are human agents, and wherein the customer is presented with a screen name common to both the first and second resources.

20. The method of claim 19, wherein the work assignment mechanism spoofs identifications of the first and second resources.

21. The method of claim 19, wherein the work assignment mechanism creates a session identification for the servicing of the work item and associating the session identification with both the first and second resources.

* * * * *